No. 828,359. PATENTED AUG. 14, 1906.
W. WIEBERG & M. HAUSNER.
RAILROAD TRACK ADJUSTER.
APPLICATION FILED MAR. 31, 1906.

2 SHEETS—SHEET 1.

Witnesses
Jas H Blackwood
S T Randolph Jr.

Inventors
William Wieberg
Matthew Hausner
by D. A. Gourick
Attorney

No. 828,359. PATENTED AUG. 14, 1906.
W. WIEBERG & M. HAUSNER.
RAILROAD TRACK ADJUSTER.
APPLICATION FILED MAR. 31, 1906.

2 SHEETS—SHEET 2.

UNITED STATES PATENT OFFICE.

WILLIAM WIEBERG AND MATTHEW HAUSNER, OF KOELTZTOWN, MISSOURI.

RAILROAD-TRACK ADJUSTER.

No. 828,359.     Specification of Letters Patent.     Patented Aug. 14, 1906.

Application filed March 31, 1906. Serial No. 309,106.

*To all whom it may concern:*

Be it known that we, WILLIAM WIEBERG and MATTHEW HAUSNER, citizens of the United States, residing at Koeltztown, in the county of Osage and State of Missouri, have invented certain new and useful Improvements in Railroad-Track Adjusters, of which the following is a specification.

Our invention relates to devices for adjusting railroad-tracks; and it consists of a lifting device having means for clamping the rails and mounted on a truck for shifting the track laterally.

The purpose of the invention is for use in railroad construction and in section work in adjusting and readjusting the level of the track and its alinement.

The construction, operation, and advantages of our invention will be described in detail hereinafter and illustrated in the accompanying drawings, in which—

Figure 1:
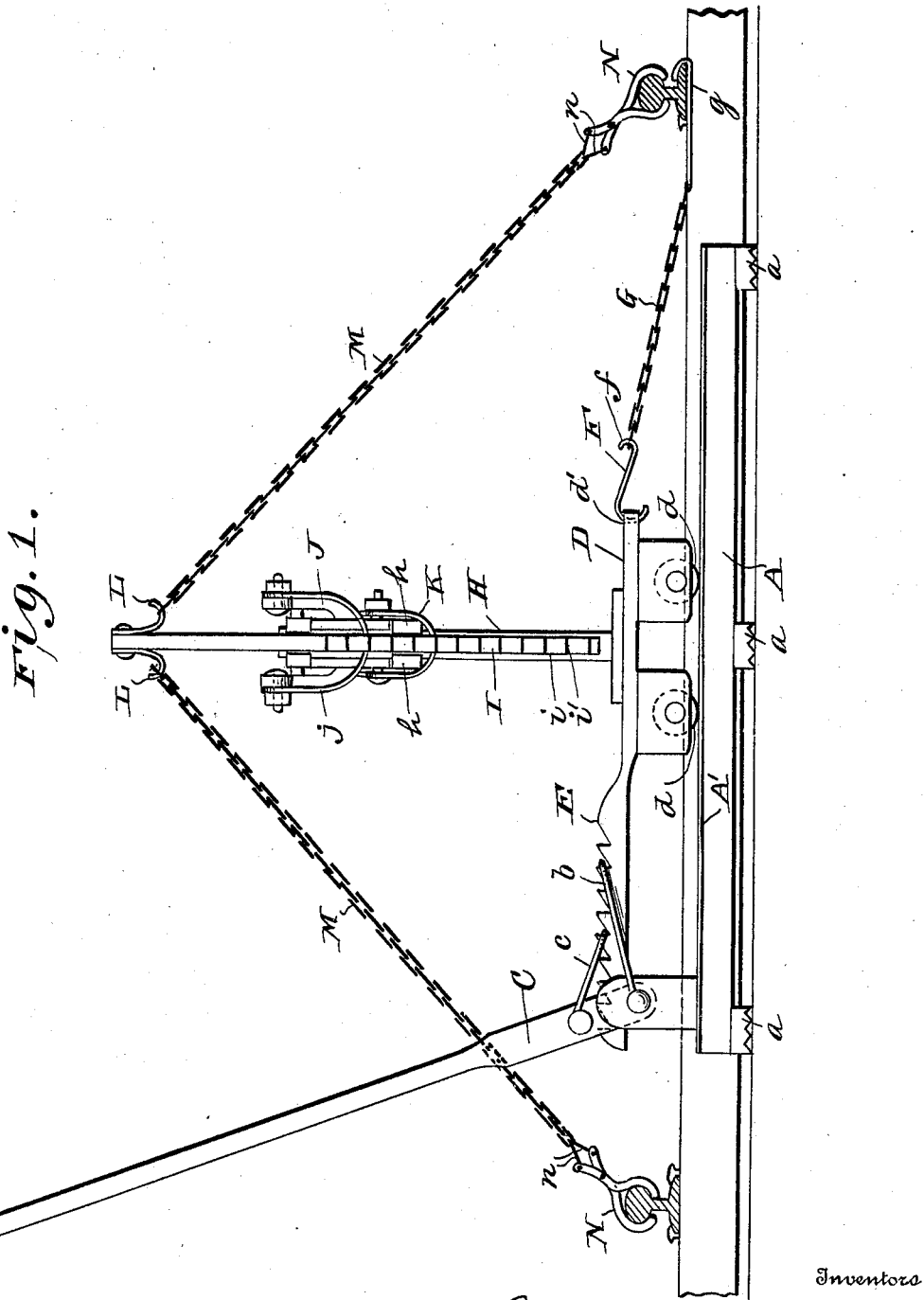
Figure 2:
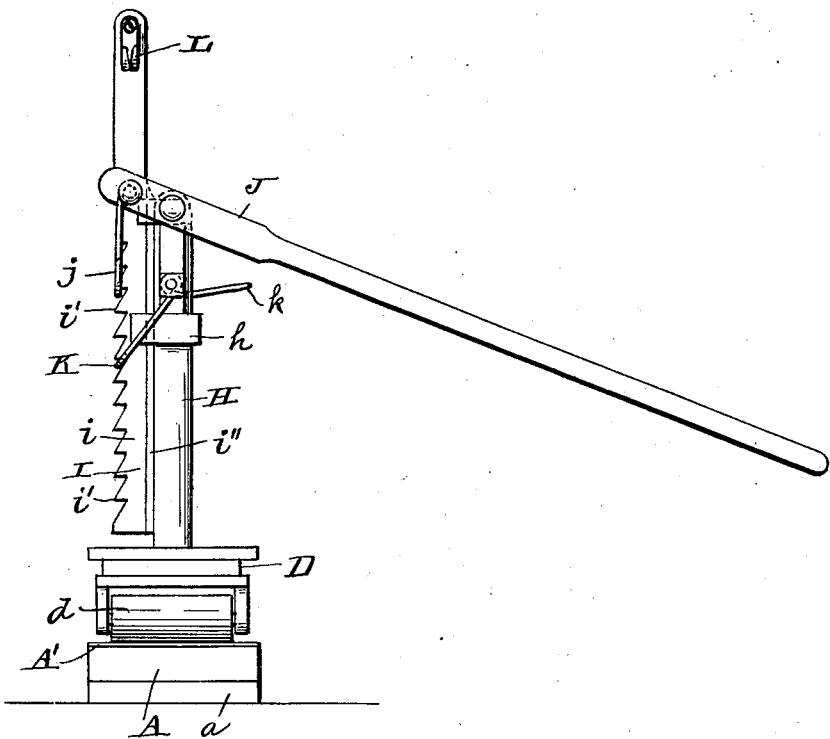
Figure 3:
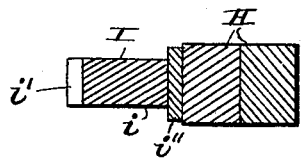

Figure 1 is a side view of our invention, showing it in operation. Fig. 2 is an end view, and Fig. 3 is a cross-section of the lifting-jack.

In the drawings similar reference characters indicate corresponding parts throughout the several views.

Our invention consists of a base A, comprising a block of timber narrow enough to be seated between the ties of an ordinary railroad-bed and having cross pieces or cleats $a$ on its base to prevent longitudinal motion of the block when the device is in operation, as hereinafter described. The upper face of the block A is covered with a sheet-metal plate A'. At one end of block A upright ears B are secured, between which is fulcrumed a lever C, having pivotally secured thereto a link $c$, while $b$ indicates a link pivotally mounted on ears B.

D indicates a truck having rollers $d$ journaled thereon, said truck being mounted on block A. At one end of truck D is secured a rack-bar E, in which the two links $b$ and $c$ work to move the truck for the purposes hereinafter stated, it being understood that the link $c$ operates to move the truck by swinging the lever C, while the link $b$ operates as a pawl to hold the truck when pressure on the lever C is released to swing it back to obtain a fresh hold. At the other end of truck D is provided a hole $d$, in which a hook F is removably secured having claws $f$ to receive and hold a chain G, having hook $g$ on its outer end to be secured to the base of a railroad-rail.

Mounted on truck D is a post H, which for greater strength is preferably made of two bars of metal secured together. I indicates a rack-bar slidably mounted between guides $h$, secured to post H, said rack-bar for the purposes of strength being also constructed of two metal (preferably steel) bars, as in the case of the post, one of said bars being indicated by the character $i$ and having the ratchet-teeth $i'$ thereon, while the other bar $i''$ is slightly wider than bar $i$ to form flanges for guiding bar I between said guides $h$.

A lever J is fulcrumed at the upper end of post H and has pivotally secured thereto a link $j$ to engage teeth $i'$ to raise rack-bar I, while a link K is pivotally secured to the post to hold the rack-bar in a raised position after being raised by the operation of the lever, this construction being the ordinary construction of ratchet-and-link jack. $k$ indicates a projection on link K for holding the link out of engagement with teeth $i'$ when desired. At the upper end of bar I are secured clawhooks L, to each of which is adjustably secured a chain or other flexible element M, having at its free end a clamp N to grip the rails. The form of clamp shown in our drawings consists of the pivoted jaw construction having a link $n$, secured to each jaw and to the end of the chain M; but said form of clamp is used for illustration only, and we do not wish to be confined thereto in the construction of our device.

The form of jack shown and hereinbefore described may be dispensed with and any other suitable form, such as a screw-jack operated by a lever-and-ratchet movement, or other suitable construction, substituted therefor without affecting the spirit and scope of our device.

In operating our invention the block A is set down between two of the ties of the track, with the end having the ears B at the side toward which it may be desired to shift the track. The clamps N are then secured to the rails at the two sides of the device and the rack-bar I elevated, by means of lever J, as above described. This will lift the rails and ties clear of the ground, and if it is desired to merely raise the level of the track the device will elevate and hold the track while being tamped and reballasted. If, however, it is desired to shift the track to one side, the hook *g* is secured to the rail and the truck D drawn along base A by means of lever C, operating through link *c*, engaging the teeth of rack-bar E. If one side of the track is to be made higher than the other, as in rounding curves, the chain on the corresponding side of our device should be shortened so as to give the desired pitch.

It will be understood that in the operation of our device the weight of the raised track serves to steady it and holds it firmly in position.

Having thus described our invention, what we claim is—

1. In a railroad-track adjuster, a lifting device, means to connect said device with the rails of a railroad-track, and means to move said lifting device transversely of the track, substantially as shown and described.

2. In a railroad-track adjuster, a lifting device, flexible elements secured to said device, means to secure said flexible elements to the railroad-rails, and means to move said lifting device transversely of the track, substantially as shown and described.

3. A railroad-track adjuster comprising a truck arranged to move transversely of the track, a lifting device mounted on said truck, means to connect said lifting device with the rails of a railroad-track, means to connect said truck with one of the rails of the track, and means to actuate said truck, substantially as shown and described.

4. A railroad-track adjuster comprising in combination with the ties and rails of a railroad-track, a block to seat between two of said ties, a truck mounted on said block, a lifting device mounted on said truck, chains adjustably secured to the lifting device and having means to clamp the rails, a chain secured to the truck and having a hook to engage one of the rails, and means to actuate said truck, substantially as shown and described.

5. A railroad-track adjuster comprising in combination with the rails and ties of a railroad-track, a block to seat between two of the ties, cross-cleats on the bottom of said block, a metal plate on the top thereof, a truck mounted on said block, a lever fulcrumed on said block, operative connections between said lever and truck, a lifting device secured to said truck, chains adjustably secured to said lifting device and having clamps to be secured to said rails, and a chain adjustably secured to the truck and having a hook thereon to engage one of said rails, substantially as shown and described.

6. A railroad-track adjuster comprising in combination with the rails and ties of a railroad-track, a block to seat between two of the ties, cross-cleats on the bottom of said block, a metal plate on the top thereof, a truck mounted on said block, a rack-bar secured to one end of said truck, a lever fulcrumed on said block, a link pivotally secured to said lever and engaging the teeth on said rack-bar, a lifting device secured to said truck, chains adjustably secured to said lifting device and having clamps to be secured to said rails, and a chain adjustably secured to the truck and having a hook thereon to engage one of said rails, substantially as shown and described.

7. A railroad-track adjuster comprising in combination with the rails and ties of a railroad-track, a block to seat between two of the ties, cross-cleats on the bottom of said block, a metal plate on the top thereof, a truck mounted on said block, a rack-bar secured to one end of said truck, upright ears on said block, a lever fulcrumed on said ears, a link pivotally secured to said lever and engaging the teeth of said rack-bar, a link pivotally secured to said ears and engaging the teeth of said rack-bar, a lifting device secured to said truck, chains adjustably secured to said lifting device and having clamps to be secured to said rails, and a chain adjustably secured to the truck and having a hook thereon to engage one of said rails, substantially as shown and described.

In testimony whereof we hereto affix our signatures in the presence of two witnesses.

WILLIAM WIEBERG.
MATTHEW HAUSNER.

Witnesses:
NATHAN J. ROWAN,
BEN. H. MELIES.